Patented Nov. 11, 1947

2,430,659

UNITED STATES PATENT OFFICE 2,430,659

METHOD OF TREATING AND APPLYING LIVE POLLEN

Leo C. Antles, Wenatchee, Wash.

No Drawing. Application December 21, 1944, Serial No. 569,270

3 Claims. (Cl. 47—58)

This invention relates to a method of treating and applying live pollen in the controlled pollination of blossoms.

An object of this invention is to supply live pollen from plant blossoms mixed with a carrier and diluent that will prolong the life and viability of the live pollen and that will make possible much easier and more efficient handling of the pollen in carrying out artificial or controlled pollination of blossoms, such as the blossoms of fruit trees.

Another object is to provide a diluted live pollen in which the carrier diluent used with the pollen supplies a needed bulk to the mixture to facilitate application and is beneficial rather than detrimental to the pollen and will help to prolong the useful life and viability of the pollen beyond the time this useful life and viability will be prolonged if the pollen grains are allowed to remain in their natural condition in which they are surrounded by their own anther shells.

Another object of this invention is to provide diluted live pollen in which the diluent is composed of particles that are somewhat similar in size and shape to the grains of pollen and will neither absorb nor give off moisture.

Another object of this invention is to provide a diluted live pollen that is particularly adapted for use in connection with a beehive insert of the type disclosed in my copending patent application, Serial Number 543,587, filed July 5, 1944.

Another object of my invention is to supply live pollen to blossoms needing the pollen service by mixing the pollen with water and spraying the pollen-bearing water onto the blossoms.

Other objects of the invention will be apparent from the following description taken in connection with the appended claims.

In the culture of some types of plants, particularly self sterile fruits, it is often advantageous to resort to artificial or controlled pollination. Such controlled pollination is carried out by first gathering suitable inter-fertile pollen from the blossoms of selected plants or trees and then causing the pollen so gathered to be supplied to the blossoms needing the pollen service. After the pollen is gathered it can be applied in different ways to the blossoms needing the pollen service. For instance, the activities of honey bees can be controlled so that the bees are caused to carry this pollen to the blossoms, as set forth in my copending patent application hereinbefore referred to; or the pollen can be applied to selected blossoms, one at a time, by means of a brush or cotton tipped applicator; or the pollen can be applied by blowing it into the blossoms; or the pollen can be dusted over an entire tree or over an entire orchard; or can be mixed with water and applied as a spray.

The pollen is composed of very fine grains and it requires considerable time to gather this pollen and get it ready for use. Also this pollen, if undiluted, deteriorates quite rapidly after it is gathered and is thus of a perishable nature. The above mentioned factors contribute to increase the cost of the pollen and to limit the available supply of the same. On this account it becomes very desirable to preserve the life and viability of the pollen to as great an extent as possible and to use the pollen as efficiently and economically as possible and avoid waste of the pollen.

In accordance with my invention I mix the pollen with a carrier diluent which preserves the life and viability of the pollen and provides sufficient bulk to make possible easy and efficient handling of the pollen.

I have discovered that a carrier diluent for live pollen should be composed of particles of a size and shape somewhat similar to the size and shape of the pollen grains; that such a carrier diluent should neither absorb nor give off moisture; that such a carrier diluent should be neutral both in relation to its own particles and to the pollen grains to prevent clustering and interfering with stigmatic contacts; and that such a carrier diluent should protect the pollen grains in such a manner as to lengthen rather than detract from their life and viability.

I have discovered that *Lycopodium clavatum* meets all of the above requirements and can be satisfactorily used as a carrier diluent for live pollen. *Lycopodium clavatum* is a vegetable spore that is odorless and tasteless and will neither absorb nor give off moisture. Its grains are of uniform shape and are not much larger than the grains of apple blossom pollen. *Lycopodium clavatum* is found in the northwest portion of Maine and in some foreign countries including Russia, Poland and Switzerland.

I have successfully used *Lycopodium clavatum* as a carrier diluent for pollen in dilutions running as high as ten parts of *Lycopodium clavatum* to one part pollen. With such dilutions I have secured as high as ninety seven percent fruit set in instances where the diluted pollen mixture is blown upon the apple blossoms. My tests have shown that fresh live pollen gathered from apple blossoms will retain its life and viability from fifteen to thirty days longer when mixed with *Lycopodium clavatum* than it will when kept undiluted.

Having described my invention what I claim is:

1. The method of preserving the life and viability of live pollen after it has been gathered from blossoms, comprising mixing said live pollen with a carrier diluent of *Lycopodium clavatum*.

2. The method of controlled pollination which comprises spraying onto blossoms to be pollinated an aqueous solution containing live pollen and *Lycopodium clavatum*.

3. The method of controlled pollination which comprises dusting onto blossoms to be pollinated a composition comprising live pollen and a carrier diluent of *Lycopodium clavatum*.

LEO C. ANTLES.

REFERENCES CITED

The following references are of record in the file of this patent:

UNITED STATES PATENTS

| Number    | Name     | Date          |
|-----------|----------|---------------|
| 1,528,664 | Ferraguti | Mar. 3, 1925  |
| 1,914,364 | Eggert   | June 20, 1933 |
| 2,248,400 | Avery    | July 8, 1941  |
| 2,314,091 | Jones    | Mar. 16, 1943 |

OTHER REFERENCES

U. S. Dispensatory, 22nd edition, published 1937, pages 651 and 652; article on Lycopodium.

Garden Dictionary, published 1938, page 182, article on Crossing.

Barber, "Sugar Cane Seedling Work in India," published 1920 in volume 22 of International Sugar Journal, pages 307 through 312 in all, page 310 can suffice.

Gray's Lessons in Botany, published 1887, pages 103 and 104.